United States Patent [19]

Doyle et al.

[11] 4,138,989

[45] Feb. 13, 1979

[54] FLAT PLATE SOLAR COLLECTOR SYSTEM

[76] Inventors: George H. Doyle, 824 Camino de Paz, El Paso, Tex. 79922; John R. Johnston, Star Route, Box 1262, Corrales, N. Mex. 87048

[21] Appl. No.: 767,362

[22] Filed: Feb. 10, 1977

[51] Int. Cl.² .................................................. F24J 3/02
[52] U.S. Cl. ................................... 126/270; 126/271; 285/45
[58] Field of Search .................. 126/270, 271; 285/45; 165/172–176, 168, 171, 76

[56] References Cited

U.S. PATENT DOCUMENTS

| 329,720 | 11/1885 | Clifford | 285/45 |
|---|---|---|---|
| 2,490,659 | 12/1949 | Snyder | 126/271 X |
| 3,113,790 | 12/1963 | Matthiessen | 285/45 |
| 3,476,409 | 11/1969 | Benteler et al. | 285/175 X |
| 3,830,529 | 8/1974 | Domer | 285/45 |
| 3,918,430 | 11/1975 | Stout et al. | 126/271 |
| 4,047,516 | 9/1977 | Bruel et al. | 126/271 |
| 4,055,163 | 10/1977 | Costello et al. | 237/1 A |

Primary Examiner—William F. O'Dea
Assistant Examiner—Larry Jones
Attorney, Agent, or Firm—William L. Scherer

[57] ABSTRACT

A flat plate solar collector system embodying a plurality of individual conventional solar collector panels in which the frames of said panels are provided with notched portions or recesses for the reception of union type pipe couplings joining the headers of adjacent panels to permit the several panels to be assembled in butted side-by-side or precisely contiguous relation. Additionally, cover plates are provided for the recesses to present a unitary appearance to the assembly.

1 Claim, 3 Drawing Figures

FLAT PLATE SOLAR COLLECTOR SYSTEM

The present invention relates to a flat plate solar collector system embodying a plurality of individual flat plate solar heat exchange panels assembled in precisely contiguous relation to each other.

More particularly, the instant invention contemplates a means for interconnecting the fluid conduits of a plurality of flat plate solar collector panels in such a way that the several panels are enabled to be butted in side-by-side or precise contiguous relation to each other.

To accomplish this result, the headers in the opposite ends of the contiguously arranged solar collector panels are connected by union couplings disposed in mutually cooperating notched portions or recesses provided in adjacent panels. This form of interconnection of the panels accomplishes two important purposes, namely: to permit the use of rigid connections which will withstand higher pressures of the order of 250# p.s.i. without failure due to weathering; and to enable the elimination of space normally required in conventional structures between adjacent panels when assembled as a unit.

It has been found that rubber or plastic tubing used in many conventional installations, while they may initially meet test specifications of upwards of 150# p.s.i., when exposed to heat and pressure over extended periods of time, will dry out, weather or otherwise deteriorate and eventually burst. This condition soon results in considerable down time of the system as well as costly repairs to resume normal service.

In addition, the ability of the panel arrangement of the present invention to eliminate the spacing between the several panels affords additional exposure for roof assemblies where space is frequently extremely limited. This is especially true where large industrial units are concerned and roof area to accommodate the panel assembly is restricted by vents, stacks, piping, ducts and other necessary roof-top installations.

Other features and advantages of the present invention will become apparent as the following description of one embodiment thereof proceeds.

Referring now to the drawings.

Figure 3:
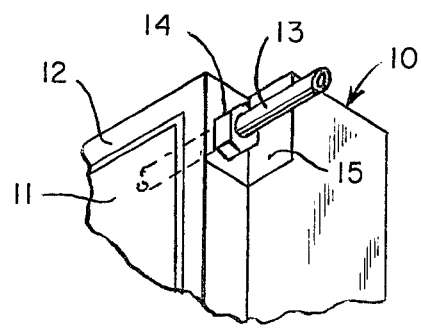

FIG. 3 discloses a portion of one of the solar collectors showing the corner recess exposing the coupling and portions of the headers.

Figure 2:
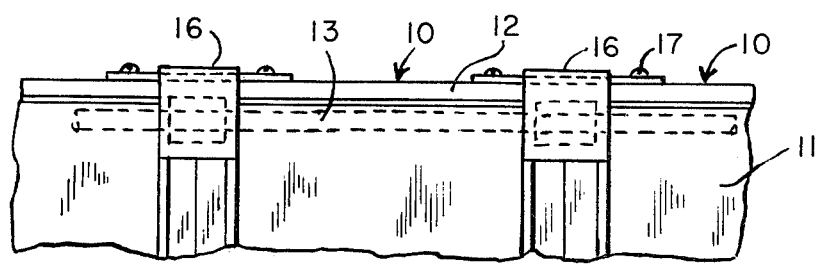
FIG. 2 is a partial showing of the assembled flat plate solar collector units butted in side-by-side relation with cover plates enclosing the recesses in the adjacent panels or solar collectors.

Several flat plate solar collector panels 10 are normally displayed in assembled relation after the manner illustrated in FIG. 2 usually on the roof of the building which is to be provided with heating and air conditioning. Unobstructed exposure to the sun's rays is of particular importance to the successful functioning of the equipment.

Figure 1:
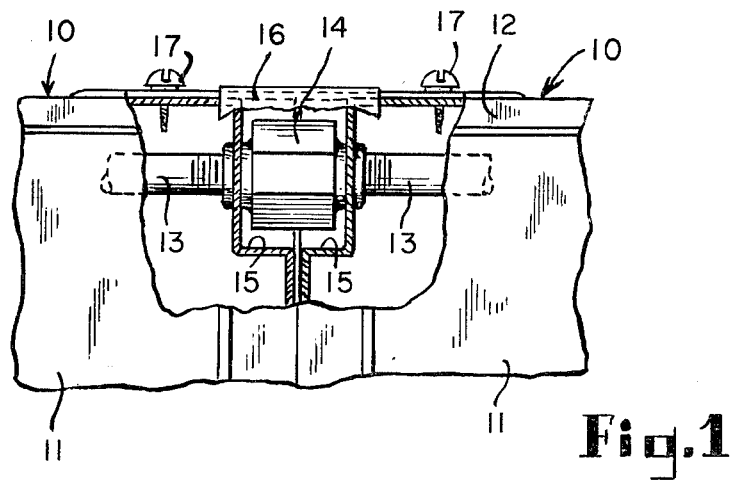
FIG. 1 is a fragmentary enlargement of two of the flat plate solar collectors with portions broken away to disclose the corner recesses housing the coupling unit and the ends of the headers of adjacent solar collectors.

As will be readily understood, a conventional solar collector or panel 10 has tempered glass plates 11 top and bottom supported in a frame 12 with a series of tubular members (not shown) extending parallel to one dimension of and between the glass plates. A header or conduit 13 (as seen in FIGS. 1 and 3) is disposed parallel to the upper and lower margins of each solar collector or the panels 10 interconnected with the internal tubing extending therebetween and internally of the glass plates. The headers 13 collect the fluid, normally water, circulated through each solar collector 10 exposed to the sun.

In an assembly of flat plate solar collector panels, the several headers 13 must be interconnected so as to enable delivery of the heated water to a suitable storage facility where it can be employed to heat and air condition the building. The interconnection is accomplished by the use of a union type pipe coupling 14. To achieve an assembly with the individual solar collector panels in precisely contiguous or butted side-by-side relation, each solar collector panel has a recess 15 formed in the corner of the frame 12 thereof to accommodate the union 14 joining the headers 13 of the adjacent flat plate solar collector panels 10.

As a further feature of the assembly, a cover plate 16 is provided to close each of the recesses 15 thereby presenting a more or less unitary construction appearance to the several solar collector panels when assembled in place. The cover plate 16 is secured to the frames 12 of adjacent solar collector panels 10 by means of the metal screws 17.

While only one preferred embodiment of the invention has been shown and described herein, it is contemplated that various changes and substitutions may be made without departing from the spirit or scope of the invention. It is desired that the invention be limited only to the extent defined by the accompanying claims.

We claim:

1. A flat plate solar collector system comprising a plurality of generally rectangularly shaped panels arranged in precisely contiguous relation; a frame defining each panel; headers disposed along and parallel to the opposed horizontal ends of each panel; mutually cooperating recesses in adjacent corners of the frames of each pair of panels and at the ends of the headers in which the recesses are provided with cover plates secured to the frames of each of the pairs of adjacent panels; and a rigid union type coupling in each of the recesses joining adjacent ends of the headers whereby the frames of the several individual panels are butted in side-by-side relation.

* * * * *